(12) United States Patent
Clark et al.

(10) Patent No.: US 9,009,600 B2
(45) Date of Patent: Apr. 14, 2015

(54) FILTER MODULE FOR A BROWSER HISTORY

(75) Inventors: Bryan William Clark, Westford, MA (US); Colin Walters, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 1087 days.

(21) Appl. No.: 12/040,749

(22) Filed: Feb. 29, 2008

(65) Prior Publication Data

US 2009/0222736 A1 Sep. 3, 2009

(51) Int. Cl.
*G06F 3/00* (2006.01)
*G06F 17/30* (2006.01)

(52) U.S. Cl.
CPC ................ *G06F 17/30876* (2013.01)

(58) Field of Classification Search
USPC ......................................... 715/738
See application file for complete search history.

(56) References Cited

U.S. PATENT DOCUMENTS

| | | | |
|---|---|---|---|
| 6,195,679 B1* | 2/2001 | Bauersfeld et al. | 709/203 |
| 7,685,276 B2* | 3/2010 | Konig et al. | 709/224 |
| 2002/0198882 A1* | 12/2002 | Linden et al. | 707/10 |
| 2007/0100653 A1* | 5/2007 | Ramer et al. | 705/1 |
| 2007/0106627 A1* | 5/2007 | Srivastava et al. | 706/20 |
| 2007/0168354 A1* | 7/2007 | Ramer et al. | 707/10 |
| 2008/0148193 A1* | 6/2008 | Moetteli | 715/854 |

* cited by examiner

*Primary Examiner* — Anil N Kumar
(74) *Attorney, Agent, or Firm* — Lowenstein Sandler LLP

(57) ABSTRACT

An embodiment relates generally to a method of filtering for a browser. The method includes providing a browser with a browser history function, the browser history function configured to store each site web page visited and stored in time sequential order as a browser history. The method also includes providing a filter module for the browser; and applying the filter module to the browser history function to eliminate intermediary web pages from entering the browser history.

17 Claims, 3 Drawing Sheets

FILTER MODULE FOR A BROWSER HISTORY

FIELD

This invention relates generally to visual desktops for computer systems, more particularly to systems and methods for a journal page for applications executing on computer systems.

DESCRIPTION OF THE RELATED ART

A Web browser ("browser) is a software program running at a client computer system that displays web pages from the Internet. The browser displays the information by interpreting the markup language (e.g., Hypertext Markup Language, HTML; Wireless Markup Language, WML; Extensible Markup Language, XML; Standard Generalized Markup Language, SGML, etc.) used to build home pages on the Web. The coding in a markup language file tells the browser how to display the text, graphics, links and multimedia files on the home page. If the browser itself is unable to display the file, the browser may utilize a plug-in, such as a multimedia player or audio player, to present the file to the user. The browser also interprets HTML tags within the HTML document as links to other web sites, or to Web resources, such as graphics, multimedia files, news groups, or files to download.

Using the browser, a user may visit a large number of web sites in various browser sessions. At each web site, a user may also visit multiple web pages during an individual browser session. In some cases, a description and an address (e.g., the Uniform Resource Locator or URL) for a web page visited during a browser session may be saved in a sequential, stack-based "history" list, possibly allowing a user to return to a previously visited web page by selecting its description from the history list. A user can open the history list to select previously viewed resources, which are usually identified by the title or address of the web page. A user can also "bookmark" a currently viewed web page in a Favorites list to facilitate selection of the bookmarked resource from the Favorites list for a later visit.

Browsers can also be used to traverse a file system, and a history list can be used to return to a previously visited directory or file within the file system. Generally, browsers may be said to browse resources, whether on the Web, in a file system, or in some other type of data storage.

As users use browsers during these browse sessions, a user can accumulate a greater number of pages in the history list. It can become difficult to find a previously web page since the pages are identified by their respective URLs. This may force a user to guess which page from the history list is the preferred web page. Alternatively, a user may go to the initial page of a web site of the preferred page and recreate the path to the preferred page. This process of relocating a preferred page on a website via their respective URLs is inefficient and time consuming.

Accordingly, there is a need in the art for a mechanism for users to quickly locate recently viewed websites and/or files without recreating the conditions for a search or browsing.

BRIEF DESCRIPTION OF THE DRAWINGS

Various features of the embodiments can be more fully appreciated, as the same become better understood with reference to the following detailed description of the embodiments when considered in connection with the accompanying figures, in which.

Figure 1:
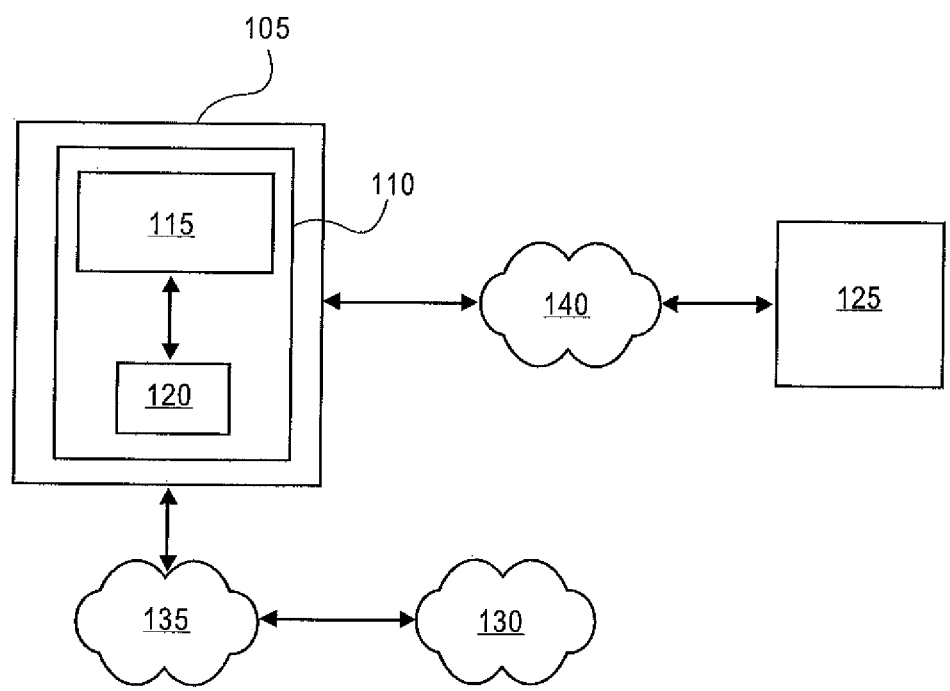
FIG. 1 depicts an exemplary system in accordance with various embodiments.

It will be appreciated that for simplicity and clarity of illustration, elements shown in the drawings have not necessarily been drawn to scale. For example, the dimensions of some of the elements are exaggerated relative to each other. Further, where considered appropriate, reference numbers have been repeated among the drawings to indicate corresponding elements and a repetitive explanation thereof will be omitted.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and method for filtering module for local and third party searching. More particularly, a filter module can be configured to filter the history of a browser. The filter module can apply heuristic algorithms to generate a filter list. The filter list can then be applied to the browser history in order to remove less useful URLs from the browser history. For instance, as a browser traverses a web site, there can be intermediary pages that are necessary but are not the preferred page by the user. These intermediary pages clutter the file history. As a result, a user may not be able to locate the preferred page again after an elapse of time and additional browsing. With the filter module, the browser history can become more of a high level journal as the intermediary pages are filtered out. Accordingly, the user can then be assured that the history list contains preferred pages. As a result, the user can efficiently and with minimal effort return to a previous web page.

FIG. 1 illustrates an exemplary system 100 in accordance with various embodiments. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 can comprise a computer device 105 executing an operating system 110. The operating system system 110 can be configured to provide application space to a browser 115 and a filtering module 120. The computer device 105 can be a laptop, a mobile computing device (e.g., PDA, cellular telephone, etc.), a desktop computer. In some embodiments, the computer device 105 can be a client of server 125 over a network (not shown).

As known to those skilled in the art, the computer device 105 can include a central processor, a keyboard, a pointing device (e.g., mouse, or the like), a display, a main memory, an input/output controller, a network port, and a storage device. The central processor can further include a cache memory for storing frequently accessed information. Cache may be an "on-chip" cache or external cache. System 100 may also be provided with additional input/output devices, such as a printer (not shown). The various components of the computer device 105 communicate through a system bus or similar architecture.

The computer device 105 can be coupled to the Internet 130 via an intermediary network 135. The intermediary network 135 can be a local area network (wired or wireless), a wide area network or combinations thereof implementing network protocols such as TCP/IP, ATM, SONET, or other known network protocols The intermediary network 135 can also be part of a network that provides access to the Internet 130. The intermediary network 135 can be configured to provide am access point for the computer device 105 for data, services, and applications to be exchanged between the computer device 105 and websites on the Internet 130. The computer device 105 can be coupled to the intermediary network 135 through a network interface (not shown). The network interface can comply with the protocol being used within the intermediary network 135.

Similarly, in some embodiments, the computer device 105 can couple with local network 140 through the network interface to communicate with server 125. For these embodiments, the computer device 105 would not be coupled to intermediary network 135. The local network 140 can be a local area network implementing a local area network protocol such as Ethernet, X.25 or other similar protocols known to those skilled in the art. The server 125 can be implemented with servers from various manufacturers such as Dell, Sun Microsystems, Fujitsu, Transmeta, Advanced MicroDevices, IBM or other similar OEM providers.

The computer device 105 can store and execute an operating system 110. The operating system 10 can be a single user operating system such as Windows, Mac O/S, Linux or multi-user operating system such as Linux, AIX, Unix, etc. The operating system 110 can provide application services for the browser 115 to operate on the computer device such as access to the network port of the computer device 105. The browser 115 can be a web browser as previously described such as Opera, Firefox, Internet Explorer, Safari, etc.

In some embodiments, the computer device 105 can store and execute a filter module 120. The history module 120 can be a plug-in module or extension for the browser 115 or can be a separate applet or application. The filter module 120 can be instantiated during the activation of the browser.

The filter module 120 can be can be configured to filter the history of a browser. The filter module 120 can apply heuristic algorithms to generate a filter list. The filter list can then be applied to the browser history in order to remove less useful URLs from the browser history. For instance, as a browser traverses a web site, there can be intermediary pages that are necessary but are not the preferred page by the user. These intermediary pages clutter the file history. As a result, a user may not be able to locate the preferred page again after an elapse of time and additional browsing. With the filter module 120, the browser history can become more of a high level journal as the intermediary pages are filtered out. Accordingly, the user can then be assured that the history list contains preferred pages. As a result, the user can efficiently and with minimal effort return to a previous web page.

Figure 2:
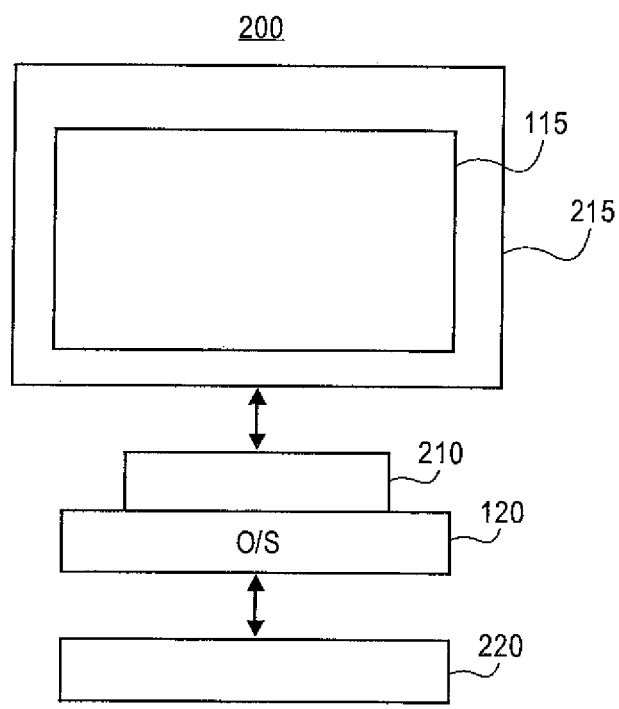
FIG. 2 illustrates an exemplary software environment in accordance with various embodiments.

FIG. 2 illustrates an exemplary software environment 200 in accordance with various embodiments. It should be readily apparent to those of ordinary skill in the art that software environment 200 depicted in FIG. 2 represents a generalized schematic illustration and that other components may be added or existing components may be removed or modified.

As shown in FIG. 2, software environment 200 can include an operating system 205. Operating system 120 can be a version of a Linux™, UNIX™, Windows™, Mac or similar operating system. A run-time environment (not shown) can be configured to execute on operating system 120. The run-time environment can provide a set of software that supports the execution of applications/programs. The run-time environment can also comprise an application program interface ("API") 210 and a complementary API (not shown) within an application space 215. API 210 can be configured to provide a set of routines that application space 215 uses to request lower-level services performed by operating system 120. Operating system 120 can include a kernel (not shown) and device drivers 220. The kernel can be configured to provide secure access to the underlying hardware of a processor through the device drivers 220.

Application space 215 can represent the space where a user can execute applications given the allotted memory space as determined by a system administrator of software environment 200. Within application space 215, a user can open and execute a number of applications such as browser 115 and filter module 120.

Figure 3:
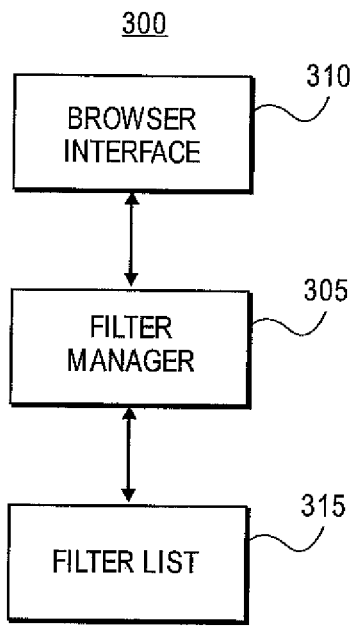
FIG. 3 depicts an exemplary filtering module in accordance with various embodiments.

FIG. 3 depicts an exemplary block diagram of the filter module 120 in accordance with various embodiments. It should be readily apparent to those of ordinary skill in the art that the filter module 120 depicted in FIG. 3 represents a generalized schematic illustration and that other components may be added or existing components may be removed or modified.

As shown in FIG. 3, the filter module 120 can comprise a filter manager 305, a browser interface 310, and a filter list module 315. The filter module 120 can be implemented using software components, hardware components or combinations thereof. In software embodiments, the filter module 120 can be implemented using computer languages such as C, C++, object oriented programming languages or other programming languages. In hardware embodiments, the filter module 120 can be implemented using a processor, microcontroller, an application specific integrated circuit, EEPROM or other programmable devices.

The filter manager 305 can provide the functionality of the filter module 120 as previously described and described herein below. The filter manager 305 can manage the interactions between the browser 115 and itself. For instance the filter manager 305 can receive a web page from the browser 115 when the user clicks to the next web page through the browser interface 310. The filter manager 305 can then retrieve the filter list from the filter list module 315 to apply to the received web page. The filter manager 305 can then determine whether to save the web page or discard depending on the results of the application of the filter list on the web page.

The browser interface 310 can be coupled to the filter manager 305. The browser interface 310 can provide an interface between the browser 115 and the filter manager 315 to receive and forward web pages. The browser interface 310 can be executed as a function call or other similar programming technique.

The controller module 405 can also be coupled to the filter list module 315. The filter list module 315 can be configured to store a list of the types of web pages that are to be excluded by the filter module 120, i.e., a filter list 320. The filter list 320 can be generated using heuristics that are based on factors such as time-on-page, type of web page, certain keywords on a web page (e.g., login, password, etc.) or detection of redirects. In some embodiments, the filter list 320 can be built on based sitemaps of web pages as known to those skilled in the art. In other embodiments, the filter list 320 can be built based on a static list of web pages that are to be filtered, which can be updated periodically.

Figure 4:
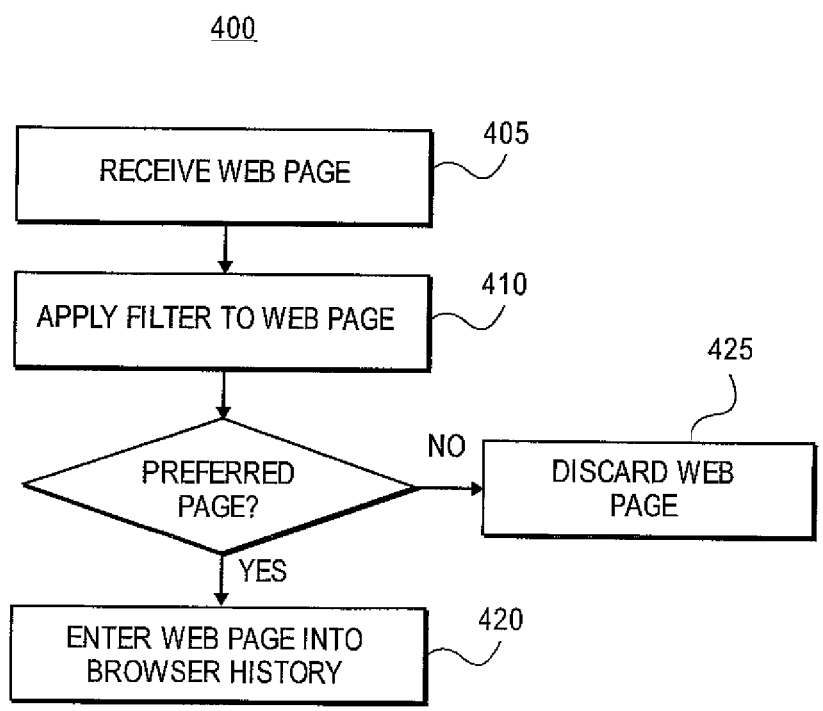
FIG. 4 shows an exemplary detailed block diagram of a filtering module in accordance with various embodiments.

FIG. 4 illustrates an exemplary flow diagram 400 executed by the filter manager 305 in accordance with various embodiments. It should be readily apparent to those of ordinary skill in the art that the flow diagram depicted in FIG. 4 represent a generalized schematic illustration and that other steps may be added or existing steps may be removed or modified.

As shown in FIG. 4, the filter manager 305 can be configured to receive a web page (or URL) from the browser 115 when the user moves onto the next web page via the browser interface 310, in step 405.

In step 510, the filter manager 305 can be configured to retrieve the filter list 320 from the filter module 315. The filter manager manager 305 can then apply the filter list to the received web page.

In step 515, the filter manager 305 can then determine whether the received web page is a preferred web page. More particularly, if the application of the filter list 320 to the received web page results in a preferred web page, the filter manager 305 can be configured to store the received web page in the browser history via the browser interface 310, in step 520. Otherwise, if the application of the filter list 320 to the receive web page results in a non-preferred web page, the filter manager 305 can be configured to discard the web page.

Figure 5:
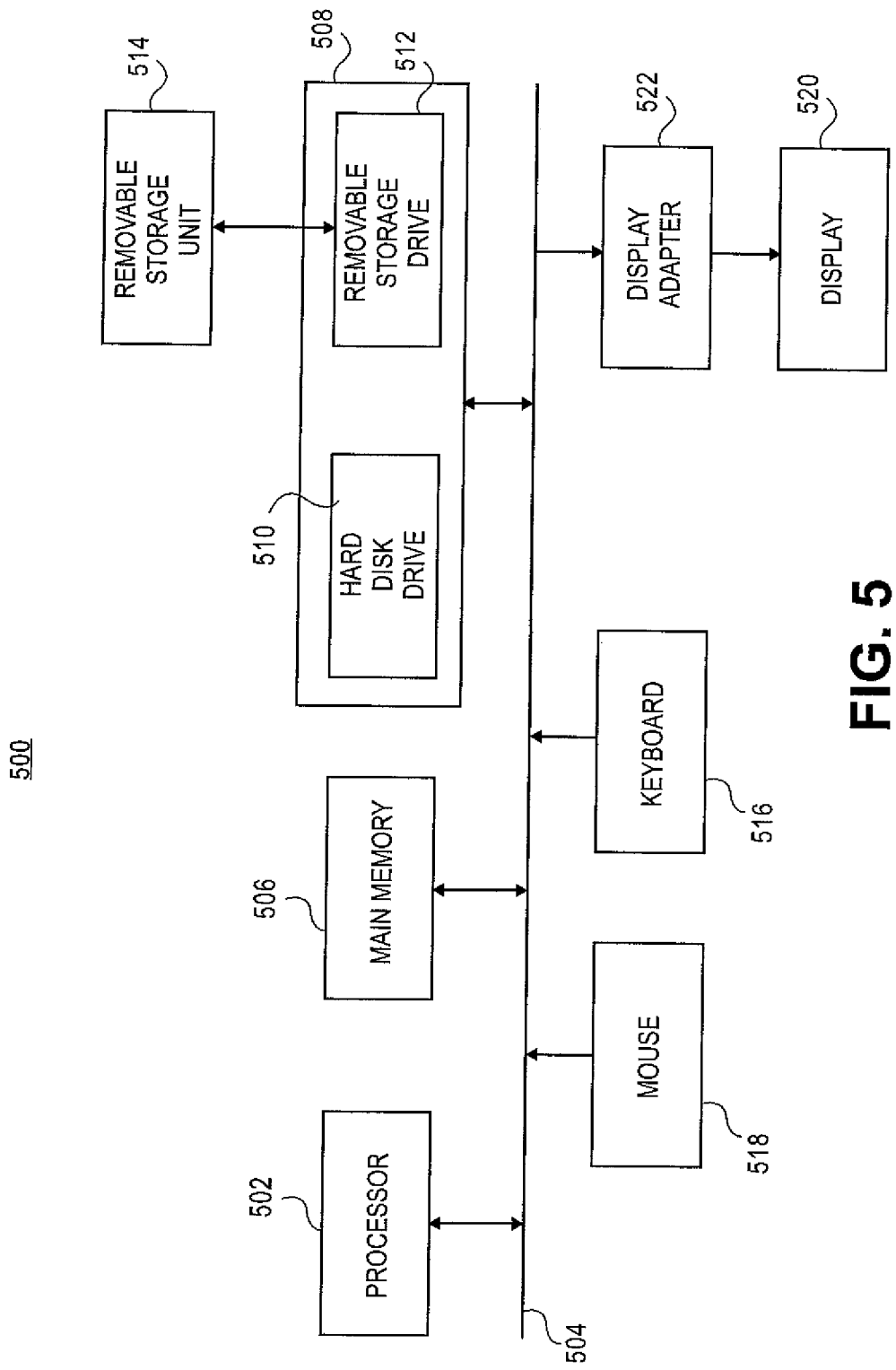
FIG. 5 illustrates an exemplary computing platform in accordance with various embodiment.

FIG. 5 depicts an exemplary block diagram of a computer device 105 where an embodiment may be practiced. The functions of the filter module 120 may be implemented in program code and executed by the computer device 105. The filter module 120 may be implemented in computer languages such as PASCAL, C, C++, JAVA, etc.

As shown in FIG. 5, the computer device 105 includes one or more processors, such as processor 502 that provide an execution platform for embodiments of the filter module 120. Commands and data from the processor 502 are communicated over a communication bus 504. The computer device 105 also includes a main memory 506, such as a Random Access Memory (RAM), where the j filter module 120 may be executed during runtime, and a secondary memory 508. The secondary memory 508 includes, for example, a hard disk drive 510 and/or a removable storage drive 512, representing a floppy diskette drive, a magnetic tape drive, a compact disk drive, flash drive, etc., where a copy of a computer program embodiment for the filter module 120 may be stored. The removable storage drive 512 reads from and/or writes to a removable storage unit 514 in a well-known manner. A user interfaces with the filter module 120 with a keyboard 516, a mouse 518, and a display 520. The display adapter 522 interfaces with the communication bus 504 and the display 520. The display adapter 522 also receives display data from the processor 502 and converts the display data into display commands for the display 520.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
providing, by a processing device without any user input, a browser with a browser history, the browser executed by the processing device;
receiving, by the processing device, indications of web pages visited by a user during a browser session of the browser;
storing, by the processing device without any user input, the visited web pages in a time-sequential order;
creating, by the processing device without any user input, a filter list in view of a heuristic algorithm generated in view of a time spent on each of the visited web pages and in view of a type of each of the visited web pages, and wherein the filter list to store a list of web page types to be excluded from the browser history;
applying, by the processing device without any user input, the filter list to the browser history;
filtering, by the processing device without any user input and in view of the applying, the browser history to remove one or more web pages in accordance with the filter list; and
creating, by the processing device without any user input, a journal from the filtered browser history that is separate from the browser history, wherein the journal comprising resulting web pages remaining from the list of web pages subsequent to the filtering, the resulting web pages comprising preferred web pages as determined from the application of the heuristic algorithm via the filter list; and
maintaining, by the processing device without any user input, the web pages within the journal after corresponding web pages are filtered out of the browser history subsequent to at least one of an elapse of time or additional browsing in the browser.

2. The method of claim 1, wherein the heuristic algorithm is created in view of a sitemap for a website.

3. The method of claim 1, wherein the heuristic algorithm is created in view of detecting at least one redirect from a website.

4. The method of claim 1, wherein the heuristic algorithm is created in view of a sitemap of a visited web page.

5. The method of claim 1, wherein the heuristic algorithm is created in view of a static list of web pages.

6. A system comprising:
a memory to store a browser history of a browser, the browser history to store web pages visited by a user during a browser session of the browser in a time-sequential order without any user input; and
a processing device communicably coupled to the memory and comprising processing hardware, the processing device to execute the browser and to, without any user input:
create a filter list in view of a heuristic algorithm generated in view of a time spent on each of the visited web pages and in view of a type of each of the visited web pages, and wherein the filter list to store a list of web page types to be excluded from the browser history;
apply the filter list to the browser history;
filter, in view of the applying, the browser history to remove one or more web pages in accordance with the filter list; and
create a journal from the filtered browser history that is separate from the browser history, wherein the journal comprising resulting web pages remaining from the list of web pages subsequent to the filtering, the resulting web pages comprising preferred web pages as determined from the application of the heuristic algorithm via the filter list; and
maintain the web pages within the journal after corresponding web pages are filtered out of the browser history subsequent to at least one of an elapse of time or additional browsing in the browser.

7. The system of claim 6, wherein the heuristic algorithm is created in view of a sitemap for a website.

8. The system of claim 6, wherein the heuristic algorithm is created in view of detecting at least one redirect from a website.

9. The system of claim 6, wherein the heuristic algorithm is created in view of elapsed time on a web page.

10. The system of claim 6, wherein the heuristic algorithm is created in view of a sitemap of a visited web page.

11. The system of claim 6, wherein the heuristic algorithm is created in view of a static list of web pages.

12. A non-transitory computer-readable storage medium having instructions stored thereon that, when executed by a processing device, cause the processing device to:

provide, by the processing device without any user input, a browser with a browser history, the browser executed by the processing device;
receive, by the processing device, indications of web pages visited by a user during a browser session of the browser;
store, by the processing device without any user input, the visited web pages in a time-sequential order;
create, by the processing device without any user input, a filter list in view of a heuristic algorithm generated in view of a time spent on each of the visited web pages and in view of a type of each of the visited web pages, and wherein the filter list to store a list of web page types to be excluded from the browser history;
apply, by the processing device without any user input, the filter list to the browser history;
filter, by the processing device without any user input and in view of the applying, the browser history to remove one or more web pages in accordance with the filter list; and
create, by the processing device without any user input, a journal from the filtered browser history that is separate from the browser history, wherein the journal comprising resulting web pages remaining from the list of web pages subsequent to the filtering, the resulting web pages comprising preferred web pages as determined from the application of the heuristic algorithm via the filter list; and
maintain, by the processing device without any user input, the web pages within the journal after corresponding web pages are filtered out of the browser history subsequent to at least one of an elapse of time or additional browsing in the browser.

13. The non-transitory computer-readable storage medium of claim 12, wherein the heuristic algorithm is created in view of a sitemap for a website.

14. The non-transitory computer-readable storage medium of claim 12, wherein the heuristic algorithm is created in view of detecting at least one redirect from a web site.

15. The non-transitory computer-readable storage medium of claim 12, wherein the heuristic algorithm is created in view of elapsed time on a web page.

16. The non-transitory computer-readable storage medium of claim 12, wherein the heuristic algorithm is created in view of a static list of web pages.

17. The non-transitory computer-readable storage medium of claim 12, wherein the heuristic algorithm is created in view of a sitemap of a visited web page.

* * * * *